United States Patent
Mukasa

(10) Patent No.: US 6,959,136 B2
(45) Date of Patent: Oct. 25, 2005

(54) OPTICAL FIBER AND OPTICAL TRANSMISSION LINE

(75) Inventor: Kazunori Mukasa, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/613,376

(22) Filed: Jul. 3, 2003

(65) Prior Publication Data

US 2004/0033042 A1 Feb. 19, 2004

Related U.S. Application Data

(63) Continuation of application No. 09/798,448, filed on Mar. 2, 2001, now Pat. No. 6,600,862, which is a continuation of application No. PCT/JP00/00513, filed on Aug. 17, 2000.

(30) Foreign Application Priority Data

Aug. 20, 1999 (JP) ............................................. 11-234767
Dec. 22, 1999 (JP) ............................................. 11-364609

(51) Int. Cl.$^7$ ................................................. G02B 6/02
(52) U.S. Cl. ...................... 385/124; 385/123; 385/127
(58) Field of Search ................................ 385/123–128

(56) References Cited

U.S. PATENT DOCUMENTS

| | | | | |
|---|---|---|---|---|
| 5,559,921 A | * | 9/1996 | Terasawa et al. | 385/124 |
| 5,748,824 A | * | 5/1998 | Smith | 385/124 |
| 5,854,871 A | | 12/1998 | Akasaka | |
| 5,960,146 A | * | 9/1999 | Okuno et al. | 385/122 |
| 6,072,929 A | * | 6/2000 | Kato et al. | 385/123 |
| 6,181,858 B1 | | 1/2001 | Kato et al. | |
| 6,256,440 B1 | * | 7/2001 | Kato et al. | 385/123 |
| 6,275,638 B1 | * | 8/2001 | Sasaoka et al. | 385/127 |
| 6,335,995 B1 | * | 1/2002 | Kato et al. | 385/123 |
| 6,360,046 B1 | * | 3/2002 | Sasaoka et al. | 385/124 |
| 6,487,353 B2 | * | 11/2002 | Kato et al. | 385/127 |
| 6,546,177 B1 | * | 4/2003 | Matsuo et al. | 385/123 |
| 6,556,755 B2 | * | 4/2003 | Tsukitani et al. | 385/123 |
| 2001/0001624 A1 | * | 5/2001 | Ma et al. | 385/123 |
| 2001/0017967 A1 | * | 8/2001 | Hirano et al. | 385/123 |
| 2002/0102082 A1 | * | 8/2002 | Sarchi et al. | 385/123 |
| 2005/0000262 A1 | * | 1/2005 | Tirloni | 385/127 |

FOREIGN PATENT DOCUMENTS

| | | |
|---|---|---|
| EP | 0 779 524 A2 | 6/1997 |
| EP | 0 862 069 A2 | 9/1998 |
| GB | 2 299 473 A | 10/1996 |
| JP | 9-211511 A | 8/1997 |
| JP | 2001-159721 A | 6/2001 |
| WO | WO 00/31573 A1 | 6/2000 |

OTHER PUBLICATIONS

Electronics Society; Sep. 7–10, 1999, Nihon University, Funabashi, p. 182.
Electronics Society, Sep. 7–10, 1999, Nihon University, Funabashi, p. 183.
Takatoshi Kato et al; "Teihisenkei, Teisonshitsu Junsekiei Core Fiber no Kaihatsu", Proceedings 1 of Electronics Society Meeting in 1999, The Institute of Electronics, Information and Communication Engineers (issued on Aug. 16, 1999) C–3–76, p. 182.
Kazuhiko Aikawa et al; "Yuko Core Danmenseki wo Kakudai shita Single Mode Hikari Fiber", Proceedings 1 of Electronics Society Meeting in 1999, the Institute of Electronics, Information and Communication Engineers (issued on Aug. 16, 1999), C–3–77, p. 183.

* cited by examiner

*Primary Examiner*—Ellen E. Kim
(74) *Attorney, Agent, or Firm*—Frishauf, Holtz, Goodman & Chick, P.C.

(57) ABSTRACT

The optical fiber has a dispersion value at a 1.55 $\mu$m-wavelength band, of 6 to 24 ps/nm/km, and satisfies A>3×D+40, where D represents a dispersion value (ps/nm/km) at a central wavelength of a 1.55 $\mu$m-wavelength band, and A represents an effective core area ($\mu m^2$). The optical transmission line for transmitting an optical signal, which includes the optical fiber is provided as well.

6 Claims, 3 Drawing Sheets

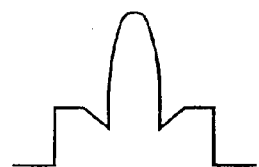 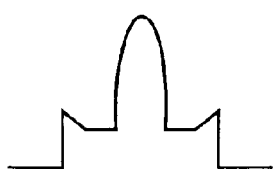 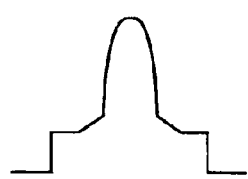
FIG. 9A　　　　FIG. 9B　　　　FIG. 9C
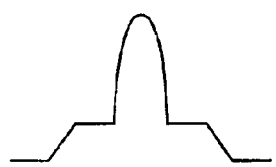 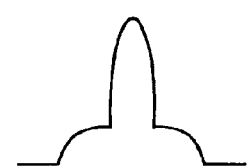 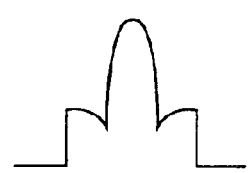
FIG. 9D　　　　FIG. 9E　　　　FIG. 9F
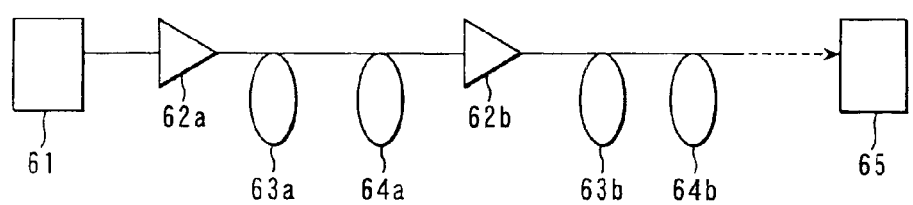
FIG. 10

OPTICAL FIBER AND OPTICAL TRANSMISSION LINE

CROSS REFERENCE TO RELATED APPLICATIONS

This is a Continuation application of Ser. No. 09/798,448 filed Mar. 2, 2001 now issued as U.S Pat. No. 6,600,862, which is a Continuation off PCT Application No. PCT/JP00/05513, filed Aug. 17, 2000, which was not published under PCT Article 21(2) in English.

This application is based upon and claims the benefit of priority from the prior Japanese Patent Applications No. 11-234767, filed Aug. 20, 1999; and No. 11-364609, filed Dec. 22, 1999, the entire contents of both of which are incorporated herein by reference.

BACKGROUND OF THE INVENTION

The present invention relates to an optical fiber and an optical transmission line including the optical fiber, and more specifically an optical transmission line which can be used suitably in wavelength division multiplexing (WDM) optical communications.

As the optical transmission technique advances in terms of an increase in speed and capacity, the WDM transmission technique is attracting much attention as the mainstream technique. However, as the power of optical signal is enhanced, a new problem has started to occur, that is, a non-linear phenomenon which takes place due to the interaction between optical signals of two or more waves within an optical path.

Of the non-linear phenomenon, the four wave mixing (FWM) is considered to entail such a drawback that noise which occurs in the WDM transmission causes a serious adverse effect on the transmission, and therefore how to suppress it is being intensively studied. For example, OFC'94 Technical Digest PD19 proposes a dispersion shift optical fiber (DSF) which shifts the wavelength band to non-zero dispersion, as means for suppressing the non-linear phenomenon.

More specifically, such a DSF that has non-zero dispersion at a 1.55 μm-wavelength band is used. In this case, the absolute value of the non-zero dispersion (unit: ps/nm/km) is, in many cases, set to 0.5 to 5.

Further, the distortion of a waveform caused by self phase modulation (SPM) and cross phase modulation (XPM) is another very serious problem. In the studies on how to solve such a problem, a research of suppressing the non-linear refraction index ($n_2$) reported in OFC'97 TuNlb or the like, is studied, and further attention is paid to the technique for enlarging the mode field diameter (MFD) of the DSF, that is, the technique for enlarging the effective core area ($A_{eff}$) of the core.

The distortion φNL of a signal, which is caused by the non-linear phenomenon is expressed generally by the following formula (1):

$$\phi NL = (2\pi \times n_2 \times L_{eff} \times P)/(\lambda \times A_{eff}) \quad (1)$$

From the formula (1), it is understood that in order to decrease the distortion, φNL of a signal, which is caused by the non-linear phenomenon, $A_{eff}$ should be large to be advantageous. Further, $A_{eff}$ is expressed by the following formula (2):

$$A_{eff} = k \times (MFD)^2 \quad (2)$$

where k is a constant.

From the formula (2), when MFD is large, a low non-linearity can be obtained very efficiently.

As reported in OFC'96 WK15 and OFC'97 TuN2, the enlargement of MFD is presently one of the most required characteristics for the DSF.

Besides the non-linear phenomenon, the distortion of waveform due to dispersion is another problem in terms of the transmission characteristics of optical fiber. For the suppression of the distortion of the waveform due to the dispersion while suppressing the non-linear phenomenon, the method for managing the dispersion over the total optical line is effective. For example, in Jpn. Pat. Appln. KOKAI Publication No. 6-11620 proposes an optical transmission line achieved by combining a single-mode optical fiber (SMF) having zero dispersion at about 1.3 μm and a dispersion compensation optical fiber (DCF).

Further, recently, an optical transmission line achieved by combining an SMF and a cable-type DFC is proposed in, for example, Jpn. Pat. Appln. KOKAI Publication No. 10-325913.

In general, a DSF having zero dispersion or micro-dispersion at a 1.55 μm-wavelength band has a high non-linearity and is easily influenced by XPM or SPM. As in the conventional case, a great number of researches have been made to reduce the non-linearity by enlargement of the MFD of the DSF; however the enlargement of the MFD of the DSF generally entails bending loss or an increase in dispersion slope. In the case of a DSF having non-zero dispersion at a 1.55 μm-wavelength band, although its use at a wavelength band for zero dispersion is avoided, the wavelength dispersion per unit length (to be called local dispersion, hereinafter) is small, and therefore the FWM easily occurs as compared to the case of SMF.

On the other hand, the SMF has a larger positive local dispersion (about 16 ps/nm/km at a 1.55 μm-wavelength band) than that of a DSF having non-zero dispersion at a 1.55 μm-wavelength band, and therefore the FWM can be easily avoided. Further, since $A_{eff}$ is relatively large (about 80 μm$^2$), a non-linear phenomenon such as XPM or SPM does not easily occur. Here, the deterioration of a signal waveform occurs due to large dispersion at a 1.55 μm-wavelength band; however it can be solved by managing the total line with use of a dispersion compensation optical fiber such as described above. Further, in general, an SMF has a low loss and low PMD. That is, it can be said that an SMF is a relatively suitable fiber for the WDM transmission.

However, as the speed and capacity of data transmission is further increased in the future, very high power is input to a fiber and therefore even a present SMF might have a problem of non-linear phenomenon. Further, a dispersion compensation optical fiber for compensating dispersion of SMF has a high non-linearity due to its structure, and therefore a non-linear phenomenon such as XPM or SPM easily occurs.

Under these circumstances, an object of the present invention is to provide a positive dispersion optical fiber of a new type, which solves the above-described problems.

Another problem of the present invention is to provide an optical transmission line which includes such a positive dispersion optical fiber in its part.

BRIEF SUMMARY OF THE INVENTION

According to the present invention, there is provided an optical fiber which has a dispersion value at a 1.55 μm-wavelength band, of 6 to 24 ps/nm/km, and satisfies A>3×D+40, where D represents a dispersion value (ps/nm/km) at a central wavelength of a 1.55 μm-wavelength band, and A represents an effective core area (μm$^2$).

Further, according to the present invention, there is provided an optical transmission line for transmitting an optical signal, which includes an optical fiber, wherein at least a part of the optical fiber has a dispersion value at a 1.55 μm-wavelength band, of 6 to 24 ps/nm/km, and satisfies A>3×D+40, where D represents a dispersion value (ps/nm/km) at a central wavelength of a 1.55 μm-wavelength band, and A represents an effective core area ($\mu m^2$).

The optical fiber of the present invention having the above-described structure has the following types.

(1) An optical fiber having: a dispersion value at a 1.55 μm-wavelength band, of 17 to 24 ps/nm/km; an effective core area at a central wavelength of a 1.55 μm-wavelength band, of 95 $\mu m^2$ or more, and a bending loss at a bending diameter of 20 mm, of 20 dB/m or less, and operating in a single mode at a 1.55 μm-wavelength band.

(2) An optical fiber having: a dispersion value at a 1.55 μm-wavelength band, of 14 to 17 ps/nm/km; an effective core area at a central wavelength of a 1.55 μm-wavelength band, of 90 $\mu m^2$ or more, and a bending loss at a bending diameter of 20 mm, of 20 dB/m or less, and operating in a single mode at a 1.55 μm-wavelength band.

(3) An optical fiber having: a dispersion value at a 1.55 μm-wavelength band, of 6 to 14 ps/nm/km; an effective core area at a central wavelength of a 1.55 μm-wavelength band, of 75 $\mu m^2$ or more, and a bending loss at a bending diameter of 20 mm, of 20 dB/m or less, and operating in a single mode at a 1.55 μm-wavelength band.

(4) An optical fiber having a dispersion slope (unit: $ps/nm^2/km$) at a 1.55 μm-wavelength band, of 0.08 or less in absolute value.

(5) An optical fiber having a transmission loss at a central wavelength of a 1.55 μm-wavelength band, of 0.25 dB/km or less, and a polarization mode dispersion value of 0.15 $ps/km^{1/2}$ or less.

(6) An optical fiber having a transmission loss at an entire wavelength band of 1.55 μm, of 0.25 dB/km or less.

(7) An optical fiber comprising a single layer core and clad, and having a refractive index profile of a single peaked structure, which satisfies $0.2\% \leq \Delta 1 \leq 0.35\%$ where $\Delta 1$ is a relative refractive index difference of the core with reference to the refractive index of the clad.

(8) An optical fiber comprising a single layer core and clad, and having a refractive index profile of a single peaked structure, which satisfies $0.2\% \leq \Delta 1 \leq 0.6\%$ where $\Delta 1$ is a relative refractive index difference of the core, with reference to the refractive index of the clad, and having an a value which satisfies $1 \leq \alpha \leq 6$ where α is a value obtained when the refractive index profile is approximated with an α curve.

(9) An optical fiber comprising a center core, a side core and a clad in order from an inner side, and having a refractive index profile of a two-layer core type, which satisfies $0.2\% \leq \Delta 1 \leq 0.35\%$ and $-0.3\% \leq \Delta 2 < 0$ where $\Delta 1$ is a relative refractive index difference of the center core, with reference to the refractive index of the clad, and where $\Delta 2$ is a relative refractive index difference of the side core, with reference to the refractive index of the clad, and satisfies $0.3 \leq a/b \leq 0.7$ where a represents an outer diameter of the center core and b represents an outer diameter of the side core.

(10) An optical fiber comprising a center core, a side core and a clad in order from an inner side, and having a refractive index profile of a two-layer core type, which satisfies $0.2\% \leq \Delta 1 \leq 0.7\%$ and $-0.3\% \leq \Delta 2 \leq -0.1\%$ where $\Delta 1$ is a relative refractive index difference of the center core, with reference to the refractive index of the clad, and where $\Delta 2$ is a relative refractive index difference of the side core, with reference to the refractive index of the clad, and satisfies $0.3 \leq a/b \leq 0.7$ where a represents an outer diameter of the center core and b represents an outer diameter of the side core, and has an a value which satisfies $1 \leq \alpha \leq 6$ where α is a value obtained when the refractive index profile is approximated with an α curve.

(11) An optical fiber comprising a center core, a side core and a clad in order from an inner side, and having a refractive index profile of a two-layer core type, which satisfies $0.2\% \leq \Delta 1 \leq \Delta 1 \leq -0.35\%$ and $0 < \Delta 2 < \Delta 1$ where $\Delta 1$ is a relative refractive index difference of the center core, with reference to the refractive index of the clad, and where $\Delta 2$ is a relative refractive index difference of the side core, with reference to the refractive index of the clad, and satisfies $0.3 \leq a/b \leq 0.7$ where a represents an outer diameter of the center core and b represents an outer diameter of the side core.

(12) An optical fiber comprising a center core, a side core and a clad in order from an inner side, and having a refractive index profile of a two-layer core type, which satisfies $0.2\% \leq \Delta 1 \leq 0.7\%$, $0.1\% \leq \Delta 2 \leq 0.3\%$ and $\Delta 1 > \Delta 2$ where $\Delta 1$ is a relative refractive index difference of the center core, with reference to the refractive index of the clad, and where $\Delta 2$ is a relative refractive index difference of the side core, with reference to the refractive index of the clad, and satisfies $0.3 \leq a/b \leq 0.7$ where a represents an outer diameter of the center core and b represents an outer diameter of the side core, and has an a value which satisfies $1 \leq \alpha \leq 6$ where a is a value obtained when the refractive index profile is approximated with an a curve.

(13) An optical fiber according to (11), (12), wherein at least a part of the side core has a refractive index variation portion.

(14) An optical fiber comprising a center core, a side core and a clad in order from an inner side, and having a refractive index profile of a two-layer core type, which satisfies $0.6\% \leq \Delta 2 \leq 1.0\%$ and $-1.2 \leq \Delta 1/\Delta 2 \leq -0.4$ where $\Delta 1$ is a relative refractive index difference of the center core, with reference to the refractive index of the clad, and where $\Delta 2$ is a relative refractive index difference of the side core, with reference to the refractive index of the clad, and satisfies $0.3 \leq a/b \leq 0.7$ where a represents an outer diameter of the center core and b represents an outer diameter of the side core.

(15) An optical fiber comprising a center core, a first side core, a second side core and a clad in order from an inner side, and having a refractive index profile of a three-layer core type, which satisfies $0.6\% \leq \Delta 2 \leq 1.0\%$, $-1.2 \leq \Delta 1/\Delta 2 \leq -0.4$ and $0.2 \leq \Delta 2/\Delta 3 \leq 0.6$ where $\Delta 1$ is a relative refractive index difference of the center core, with reference to the refractive index of the clad, and where $\Delta 2$ is a relative refractive index difference of the first side core, with reference to the refractive index of the clad, $\Delta 3$ is a relative refractive index difference of the second side core, with reference to the refractive index of the clad, and satisfies $0.3 \leq a/b \leq 0.7$ and $0.2 \leq a/c \leq 0.5$ where a represents an outer diameter of the center core, b represents an outer diameter of the first side core, and c represents an outer diameter of the second side core.

(16) An optical fiber according to (15), wherein at least a part of the second side core has a refractive index variation portion.

It should be noted here that in the present specification, unless it is specifically indicated, the 1.5 μm-wavelength band is meant to be a wavelength range of 1520 to 1620 nm, and the 1.55 μm-wavelength band is meant to be a wavelength band of the 1.5 μm-wavelength band, where signal is actually transmitted in an optical transmission line, which is, for example, a wavelength range of 1530 to 1570. Further, the band of the 1.55 μm-wavelength band is supposed to be a band of 30 nm or higher, in consideration of being used in the WDM transmission.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 9A to 9F are diagrams showing various examples of the profile of the refractive index of a different version of the optical fiber according to the sixth embodiment of the present invention; and FIG. 10 is a diagram showing a transmission system according to the seventh embodiment of the present invention.

DETAILED DESCRIPTION OF THE INVENTION

The optical fiber of the present invention is a remodeled version of the conventional SMF, and the actual use form thereof is substantially the same as that of the conventional SMF. Here, the optical fiber of the present invention will now be described in consideration of the actual use form of the conventional SMF.

The conventional SMF has a dispersion of about 16 ps/nm/km near a wavelength of 1.55 μm and has a dispersion slope of about 0.065 ps/nm²/km. When transmission is carried out near a wavelength of 1.55 μm with use of the SMF, the distortion of the waveform occurs due to the dispersion. For this reason, an SMF is generally used in combination with an optical fiber for compensating dispersion of the SMF, which occurs near a wavelength of 1.55 μm, that is, for example, DCF. Therefore, in order to consider the transmission characteristics of the SMF near a wavelength of 1.55 μm, it is realistic to evaluate the total performance of the optical transmission line including the DCF.

The DCF can be designed to have a negative dispersion and a negative dispersion slope by controlling the distribution (profile) of its refractive index. Therefore, when DCFs and SMFs are combined in respectively appropriate quantity, the dispersion of the optical transmission line as a whole can be adjusted to become approximately zero in a wide range of the 1.5 μm-wavelength band. In this manner, where performing the WDM transmission at the 1.5 μm-wavelength band, it becomes possible to suppress the deterioration of the signal waveform, which is caused by the dispersion.

Further, even if the dispersion of the optical transmission line as a whole is substantially zero, an SMF and DCF has a large local-dispersion, and therefore it is possible to suppress FWM as well, which is prominent in a non-zero small dispersion region. Therefore, the optical transmission line having a structure of combination of SMFs and DCFs is very suitable for high-speed and large capacity WDM transmission.

However, even if the deterioration of the waveform, which is caused by the dispersion and FWM can be suppressed, when $A_{eff}$ of the optical finer is small or the non-linear refractive index is large, the deterioration of the signal waveform due to the XPM or SPM easily occurs.

Figure 6:
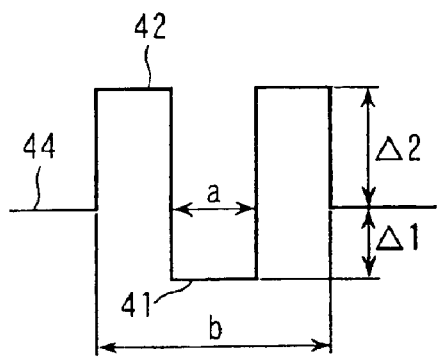
FIG. 6 is a diagram showing an example of the profile of the refractive index of an optical fiber according to the fourth embodiment of the present invention.

These non-linear phenomena are prominent when the power of light is high, and therefore such an order as shown in FIG. 6 is effective, that is, an optical fiber having a lower non-linearity is arranged after the optical amplifier in the path, and an optical fiber of a higher non-linearity than that of the one provided in the front stage is arranged at sections where the light has been weakened. For example, it is considered that the following arrangement order is preferable in order to suppress the deterioration of the waveform, caused by the non-linear phenomenon such as SPM or XPM. That is, an SMF having an $A_{eff}$ value of 80 μm² or higher is arranged immediately after the optical amplifier, and a DCF having $A_{eff}$ value of about 20 μm² is arranged in a later stage.

Nevertheless, the non-linearity of the DCF is significantly large as compared to that of the SMF, and therefore for a large-capacity transmission, it is possible that the deterioration of the waveform occurs due to the non-linear phenomena within the DCF. Further, recently, there has been developed a dispersion compensation type optical fiber having a lower non-linearity, which is called RDF, as reported in ECOC'97 Vol. 1, page 127.

However, with such an RDF, the non-linearity expressed by the formula (1) is one-order larger as compared to the case of the SMF and consequently, there is a possibility that the non-linear phenomenon cannot be neglected for the case of large-capacity transmission.

Under these circumstances, for example, if the length of the fiber in the preceding stage can be made longer, the fiber having a lower non-linearity can be made longer. Consequently, the light with a more attenuated power is made incident on the high non-linearity fiber situated on the later stage. In this manner, the non-linear phenomena of the fiber of the later stage can be suppressed.

Further, the SMF itself, although it has an $A_{eff}$ value of about 80 $\mu m^2$ and is of a low non-linearity type, is an optical fiber placed immediately after the optical amplifier. Therefore, it is considered that there will be a demand of further extension of the $A_{eff}$ value, that is, reduction of the non-linearity, as the distance and capacity increase rapidly.

Further, generally, SMFs and DCFs are matched together in terms of lengths thereof such that the dispersion in total becomes substantially zero, and therefore as the dispersion in an SMF becomes smaller, the length of the SMF becomes longer. The conventional SMF has a dispersion of about +16 ps/nm/km, and therefore if it is possible to make the dispersion about +16 ps/nm/km or less, the length of the SMF with respect to the entire length of the transmission line can be elongated. As a result, it becomes possible to control the power of signal made incident on a high non-linear fiber located in a later stage.

However, when the dispersion value comes excessively small, there is a possibility that the FWM phenomenon occurs. Thus, we consider that the dispersion value should preferably be near +6 to +14 ps/nm/km. Further, with regard to the non-linearity, if a level similar to the conventional one can be achieved, the non-linear phenomenon in an optical fiber in a later stage can be suppressed, and therefore it is considered that the non-linear phenomenon in total can be suppressed.

Further, while maintaining the dispersion of the SMF at about the present level (+14 to +24 ps/nm/km), if the $A_{eff}$ value can be expanded further to about 90 $\mu m^2$ or more, preferably, 95 $\mu m^2$ or more (that is, expanding the $A_{eff}$ value by about 10% or more as compared to the conventional type SMF), the non-linear phenomenon in the SMF in the preceding stage can be suppressed to a lower level than that of the conventional case. Therefore, the non-linear phenomenon can be suppressed in the optical transmission line as a whole.

Preferably, the $A_{eff}$ value of the SMF should be expanded and the dispersion value should be made smaller than that of the conventional SMF, for example, about +6 to +14 ps/nm/km. In this manner, the non-linear phenomena in both of the preceding and later stages can be suppressed, and therefore the non-linear phenomenon in the optical transmission line as a whole is considered to become a very small value.

Under these circumstances, a novel optical fiber having a low non-linearity, which is different from the conventional SMF, that is, an optical fiber having a dispersion value at a wavelength of 1.55 $\mu m$, of 6 to 24 ps/nm/km, which satisfies A>3×D+40 where D (ps/nm/km) represents a dispersion value at a central wavelength in a 1.55 $\mu m$-wavelength band, and A ($\mu m^2$) represents the effective core area, as well as a transmission line which uses such an optical fiber are proposed.

However, if the dispersion slope is increased as compared to that of the conventional SMF, it becomes difficult to compensate the dispersion in a wide range despite that the dispersion compensation-type optical fiber is used. Therefore, it is preferable that the distribution of the refractive index should be set to note that the absolute value of the dispersion slope (unit: ps/nm²/km) does not increase to become over 0.08.

Further, when the bending loss increases, a serious problem such as an increase in loss after forming a cable, will be caused. Therefore, it is preferable that the distribution of the refractive index should be set to note that the bending loss at a bending diameter of 20 mm does not become 20 dB or more.

Further, in the case where an optical fiber is used in a practical use condition, that is, for example, being formed into a cable, and thereby the cut-off wavelength becomes larger than the minimum wavelength of the wavelengths utilized, that is, the minimum wavelength of the 1.55 $\mu m$-wavelength band, the single mode operation in the optical transmission line as whole cannot be guaranteed. In order to avoid this, it is desirable that the distribution of the refractive index should be set noting that the cut-off wavelength under at least a practical use condition should not become the minimum wavelength of the wavelengths used or more.

Various embodiments of the present invention will now be described with reference to accompanying drawings.

Figure 1:
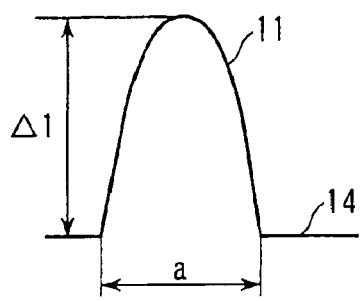
FIG. 1 is a diagram showing an example of the profile of the refractive index of an optical fiber according to the first embodiment of the present invention.

FIG. 1 is an explanatory diagram showing the profile of the refractive indexes of an optical fiber according to the first embodiment of the present invention. The refractive index profile shown in FIG. 1 indicates the index of a core 11 and that of a clad 14 from the inner side in order. The core 11 has a maximum relative refractive index difference Δ1 with respect to the clad 14. Here, the diameter of the core 11 is a.

It should be noted that the conventional SMF has a refractive index profile shown in FIG. 1. A structure in which Δ1=about 0.4% and α=infinity, that is, a structure close to a step type is general.

In view of the above, a simulation was carried out on the basis of the conventional SMF, and the result indicated that it was found that it would be possible to expand the $A_{eff}$ value to 95 $\mu m^2$ by setting Δ1 in FIG. 1 in a range of 0.2%≦Δ1≦0.35%, or setting it in a range of 0.2%≦Δ1≦0.6%, together with setting α to 1 or more and 6 or less. It should be noted that the reason for setting Δ1 to 0.2% or higher is that the bending loss is increased if Δ1 is set to less than 0.2%, and the reason for setting the upper limitation to Δ1 is not only that the $A_{eff}$ is not sufficiently expanded, but also the PMD is deteriorated if it exceeds the upper limit.

Further, the optical fiber according to this embodiment was able to obtain, in terms of dispersion, properties as good as those of the conventional SMF. Table 1 below indicates results of the simulation with the conventional SMF, and Table 2 below indicates results of the simulation with an $A_{eff}$ extension type positive distribution optical fiber according to this embodiment.

TABLE 1

| Unit | Δ1 % | α | Core diameter a $\mu m$ | Dispersion value ps/nm/km | Dispersion slope ps/nm²/km | MFD $\mu m$ | $A_{eff}$ $\mu m^2$ | λc nm |
|---|---|---|---|---|---|---|---|---|
| Sim11 | 0.40 | ∞ | 10.00 | 16.42 | 0.0597 | 10.0 | 79.4 | 1295 |

TABLE 2

| Unit | Δ1 % | α | Core diameter b μm | Dispersion value ps/nm/km | Dispersion slope ps/nm²/km | MFD μm | $A_{eff}$ μm² | λc nm |
|---|---|---|---|---|---|---|---|---|
| Sim21 | 0.35 | 14.0 | 10.00 | 16.88 | 0.0597 | 10.95 | 95.5 | 1435 |
| Sim22 | 0.30 | 15.0 | 11.75 | 17.16 | 0.0609 | 11.65 | 107.6 | 1425 |
| Sim23 | 0.25 | 14.0 | 14.50 | 18.13 | 0.0610 | 13.20 | 138.7 | 1512 |
| Sim24 | 0.40 | 2.0 | 13.50 | 14.01 | 0.0603 | 10.98 | 96.8 | 1423 |
| Sim25 | 0.40 | 3.0 | 12.50 | 15.48 | 0.0636 | 10.80 | 91.4 | 1490 |

As can be understood from Table 2 above, the $A_{eff}$ value can be expanded by setting Δ1 in a range of 0.2%≦Δ1≦0.35%. Further, in the case where Δ1 is set it in a range of 0.2%≦Δ1≦0.6%, together with setting a in a range of 1≦α≦6, the dispersion can be reduced, and the length of the positive dispersion fiber with respect to the entire light transmission line is increased. Therefore, it was found in addition to the above that the effect of suppressing the non-linear phenomenon of the dispersion compensation type optical fiber would be expected.

As described before, it is possible to achieve the lowering of the non-linearity with such a form that the core has a single layer structure; however there is a general trend that the bending loss increases. Therefore, with a structure in which a second-layer core, more specifically, a side core, is provided around the above core, and the refractive index of the side core is made lower than that of the first core (to be referred to as "center core" hereinafter) so as to have some degree of difference as compared to the clad level, the bending loss can be easily suppressed and the $A_{eff}$ can be easily expanded. Thus, although the structure becomes somewhat complicated, such a two-layer core structure can be employed.

Figure 2:
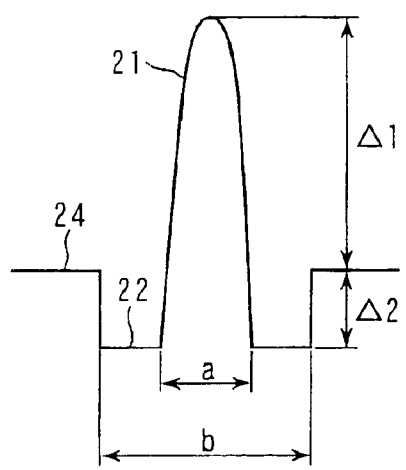
FIG. 2 is a diagram showing an example of the profile of the refractive index of an optical fiber according to the second embodiment of the present invention.

FIG. 2 is an explanatory diagram showing the profile of the refractive indexes of an optical fiber according to the second embodiment of the present invention. The refractive index profile shown in FIG. 2 indicates the refractive index of a center core 21, that of a side core 22 and that of a clad 24 from the inner side in order. The center core 21 has a maximum relative refractive index difference Δ1 with respect to the clad 24, and the side core 22 has a maximum relative refractive index difference Δ2 with respect to the clad 24. Here, the diameter of the center core 21 is a, and the diameter of the side core 22 is b. It should be noted that in FIG. 2, there is a relationship of Δ1>0>Δ2.

In the case of the optical fiber having such a refractive index profile as shown in FIG. 2, the effect of suppressing the bending loss becomes very low when Δ2>−0.1%, whereas the extension of the $A_{eff}$ becomes insufficient when Δ2>−0.3%.

Figure 3:
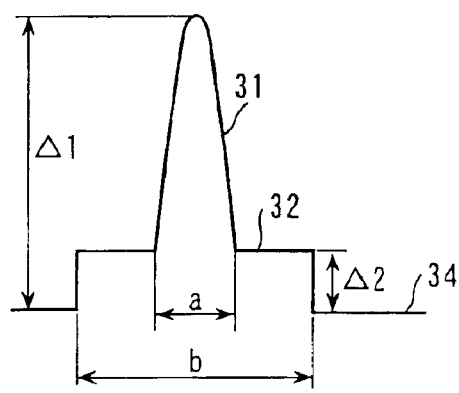
FIG. 3 is a diagram showing an example of the profile of the refractive index of an optical fiber according to the third embodiment of the present invention.

FIG. 3 is an explanatory diagram showing the profile of the refractive indexes of an optical fiber according to the third embodiment of the present invention. The refractive index profile shown in FIG. 3 indicates the refractive index of a center core 31, that of a side core 32 and that of a clad 34 from the inner side in order. The center core 31 has a maximum relative refractive index difference Δ1 with respect to the clad 34, and the side core 32 has a maximum relative refractive index difference Δ2 with respect to the clad 34. Here, the diameter of the center core 31 is a, and the diameter of the side core 32 is b. It should be noted that in FIG. 3, there is a relationship of Δ1>Δ2>0.

In the case of the optical fiber having such a refractive index profile as shown in FIG. 3, the effect of suppressing the bending loss becomes very low and the dispersion slope increases when Δ2>0.1%, whereas the extension of the $A_{eff}$ becomes insufficient when Δ2>0.3%.

Further, as to an optical fiber having such a refractive index profile as shown in FIG. 2 or FIG. 3, it was found that a core diameter ratio a/b was measured under conditions that the dispersion value at a wavelength of 1.55 μm becomes 1.5 times or less than that of the conventional SMF and the absolute value of the dispersion slope (unit: ps/nm²/km) does not exceed 0.08, and a relationship of a/b≦0.3 was obtained. Further, when a range in which the $A_{eff}$ value is expandable more than that of the conventional SMF was measured, and a relationship of a/b<=0.7 was obtained. Further, it was found that a range of a/b where the dispersion slope and the $A_{eff}$ are well balanced was 0.4≦a/b≦0.6.

Therefore, in the second and third embodiments of the present invention, it can be concluded that the maximum of the absolute value of the relative refractive index difference Δ2 of the side core with regard to the clad should preferably be 0.1%≦|Δ2|≦0.3%, and the ratio between the outer diameter a of the center core and the outer diameter b of the side core should preferably be 0.3≦a/b≦0.7.

Subsequently, in connection with the optical fibers of the second and third embodiments of the present invention, the optimization of α of the center core will now be described. As examples, a relationship between the α value and the dispersion value when α is varied in the center core 31 of the optical fiber of the third embodiment is shown in FIG. 4, and a relationship between the α value and the $A_{eff}$ value is shown in FIG. 5.

Figure 4:
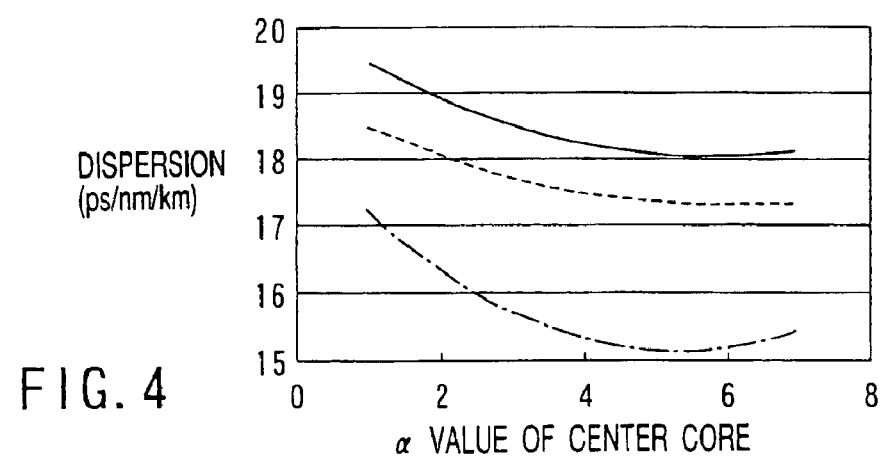
FIG. 4 is a diagram showing an example of the relationship between the α value of the center core and the dispersion characteristics in the optical fiber according to the third embodiment of the present invention.
Figure 5:
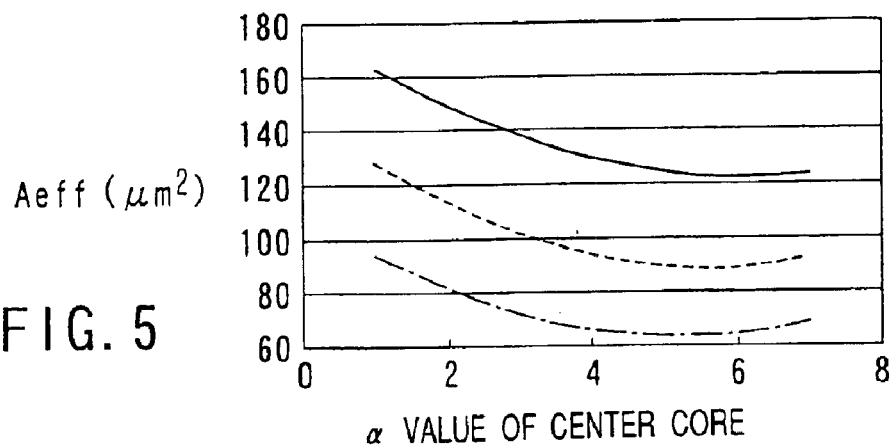
FIG. 5 is a diagram showing an example of the relationship between the a value of the center core and $A_{eff}$ in the optical fiber according to the third embodiment of the present invention.

It should be noted that in FIGS. 4 and 5, the α value is varied while Δ2 is fixed to 0.15%, the a/b value to 0.5, and the cut-off wavelength to 1500 nm.

Further, in FIG. 4, a curve indicated by a solid line in the graph illustrates the result obtained when Δ1=0.2%, a curve indicated by a dashed line in the graph illustrates the result obtained when Δ1=0.3%, and a curve indicated by a one-dot dashed line in the graph illustrates the result obtained when Δ1=0.4%.

Further, in FIG. 5, a curve indicated by a solid line in the graph illustrates the result obtained when Δ1=0.3%, a curve indicated by a dashed line in the graph illustrates the result obtained when Δ1=0.4%, and a curve indicated by a one-dot dashed line in the graph illustrates the result obtained when Δ1=0.5%.

It can be understood from FIG. 4 that when Δ1 is set to 0.4%, the dispersion becomes equal to or less than that of the conventional SMF. Further, when Δ1 is increased, the bending loss generally becomes small. However, it is also concluded from FIG. 5 that when the value of Δ1 is increased, there is a tendency that the $A_{eff}$ value becomes small. Therefore, there exists an optimal value for Δ1.

In the case where the main subject is to reduce the dispersion value as compared to the conventional SMF, it is considered that the range for Δ1 which can increase the $A_{eff}$ value higher than that of the conventional SMF is values around 0.40% at center, more specifically, 0.35 to 0.45%. In this case, it is preferable that the value for a should be in a range of 1 to 6.

In the above-mentioned range, the simulation of an optical fiber having a two-layer structure was carried out, and the following results were obtained. The results of the simulation of the optical fiber whose Δ2 is negative are shown in Table 3, and those of the optical fiber whose Δ2 is positive are shown in Table 4.

TABLE 3

| Unit | Δ1 % | α | Δ2 % | a/b | Core diameter b μm | Dispersion value ps/nm/km | Dispersion slope ps/nm²/km | MFD μm | $A_{eff}$ μm² | λc nm |
|---|---|---|---|---|---|---|---|---|---|---|
| Sim31 | 0.25 | 14.0 | −0.15 | 0.50 | 35.00 | 19.73 | 0.0628 | 14.20 | 158.4 | 1528 |
| Sim32 | 0.35 | 14.0 | −0.25 | 0.50 | 18.50 | 17.94 | 0.0607 | 11.48 | 111.3 | 1436 |
| Sim33 | 0.50 | 4.0 | −0.25 | 0.55 | 15.00 | 12.99 | 0.0592 | 10.44 | 91.2 | 1387 |

TABLE 4

| Unit | Δ1 % | α | Δ2 % | a/b | Core diameter b μm | Dispersion value ps/nm/km | Dispersion slope ps/nm²/km | MFD μm | $A_{eff}$ μm² | λc nm |
|---|---|---|---|---|---|---|---|---|---|---|
| Sim41 | 0.25 | 14.0 | 0.20 | 0.55 | 22.50 | 17.44 | 0.0619 | 13.27 | 159.2 | 1522 |
| Sim42 | 0.30 | 16.0 | 0.20 | 0.45 | 16.50 | 15.41 | 0.0609 | 12.29 | 118.3 | 1460 |
| Sim43 | 0.60 | 3.0 | 0.25 | 0.50 | 12.25 | 11.48 | 0.0611 | 10.89 | 90.7 | 1496 |
| Sim44 | 0.35 | 3.0 | 0.15 | 0.50 | 15.00 | 15.86 | 0.0648 | 12.10 | 109.1 | 1506 |
| Sim45 | 0.40 | 3.0 | 0.15 | 0.50 | 14.50 | 15.50 | 0.0670 | 11.58 | 99.8 | 1477 |
| Sim46 | 0.45 | 3.0 | 0.15 | 0.50 | 14.00 | 15.16 | 0.0692 | 11.08 | 92.9 | 1487 |
| Sim47 | 0.35 | 4.0 | 0.20 | 0.50 | 11.75 | 16.14 | 0.0619 | 11.82 | 106.2 | 1522 |
| Sim48 | 0.40 | 4.0 | 0.20 | 0.50 | 11.50 | 15.91 | 0.0634 | 11.13 | 95.1 | 1485 |
| Sim49 | 0.45 | 4.0 | 0.20 | 0.50 | 11.25 | 15.48 | 0.0651 | 10.89 | 90.1 | 1496 |

As shown in Tables 3 and 4 above, in either of the optical fibers, the $A_{eff}$ value is expanded further than that of the conventional SMF (about 80 μm²), and in two of them, the $A_{eff}$ value exceeds 150 μm². Further, in connection with the two having small α values, the dispersion value is small. As the length of the positive dispersion optical fiber increases as compared to the DCF, the optical power input to the DCF can be suppressed and thus the non-linear phenomenon can be suppressed.

FIG. 6 is an explanatory diagram showing the refractive index distribution of the optical fiber according to the fourth embodiment of the present invention. The refractive index profile shown in FIG. 6 shows the refractive indexes of the first core 41, the second core 42 and the clad 4 in the order from the inner side. The first core 41 has a minimum relative refractive index difference Δ1 with respect to that of the clad 44, and the second core 42 has a maximum relative refractive index difference Δ2 with respect to that of the clad 44. The diameter of the first core 41 is represented by a, and the diameter of the second core 42 is represented by b. It should be noted that in FIG. 6, there is a relationship of Δ1<0≦Δ2.

With regard to an optical fiber having a refractive index profile in which the center core has the refractive index profile of a depressed shape as shown in FIG. 6 was examined in terms of the possibility that it could be a low non-linear optical fiber. First, from the simulation, a profile capable of making the $A_{eff}$ value 95 μm² or more was searched from a simulation.

First, while fixing Δ2 at constant (in this case, 0.7%), the variation of the properties was examined in the case where Δ1 is changed. Here, the bending loss when the $A_{eff}$ value was set to 95 μm² or more was examined, and it was found that the bending loss would be increased unless Δ1 is −0.2% or less.

Under these circumstances, while fixing Δ1 at −0.2%, the value of Δ2 which could keep the bending loss at a bending diameter of 20 mm, to be 20 dB/m or less was examined from a simulation, and it was found that it would require 0.6% or higher. It was further found that if Δ2 exceeds 1.0%, the $A_{eff}$ value would become 95 μm² or less and the extension would be insufficient.

Further, under the above-described conditions, a range for the core diameter ratio a/b which can make the bending loss low even if the $A_{eff}$ value was 95 μm² or more was examined, and it was found that a range of 0.3≦a/b≦0.7 would be preferable and 0.4≦a/b≦0.6 would be more preferable. Within this range, various simulations were conducted, and the optimal case was searched for. The results of the search were shown in Table 5 below.

TABLE 5

| Unit | Δ1 % | Δ2 % | a/b | Core diameter b μm | Dispersion value ps/nm/km | Dispersion slope ps/nm²/km | MFD μm | $A_{eff}$ μm² | λc nm |
|---|---|---|---|---|---|---|---|---|---|
| Sim51 | −0.4 | 0.8 | 0.5 | 10.50 | 8.88 | 0.077 | 10.02 | 84.5 | 1535 |
| Sim52 | −0.5 | 0.8 | 0.5 | 11.00 | 7.16 | 0.078 | 9.65 | 76.6 | 1515 |
| Sim53 | −0.6 | 0.6 | 0.5 | 10.50 | 8.84 | 0.073 | 10.07 | 84.7 | 1508 |
| Sim54 | −0.6 | 0.7 | 0.5 | 10.00 | 7.40 | 0.073 | 9.14 | 72.8 | 1523 |

As can be understood from Table 5 above, the $A_{eff}$ can be expanded 75 μm² or more, that is, substantially the same level as that of the conventional SMF or even more.

However, the optical fiber having such a refractive index profile as shown in FIG. 6 has a merit as compared to the conventional SMF; however as to the $A_{eff}$ value, it is still at the same level as that of the conventional case. Therefore, in consideration of further extension of the $A_{eff}$ value, a new refractive index profile was examined.

Figure 7:
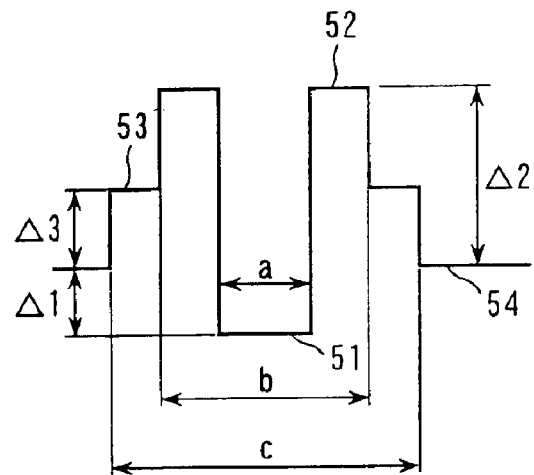
FIG. 7 is a diagram showing an example of the profile of the refractive index of an optical fiber according to the fifth embodiment of the present invention.
Figures 8A, 8B:
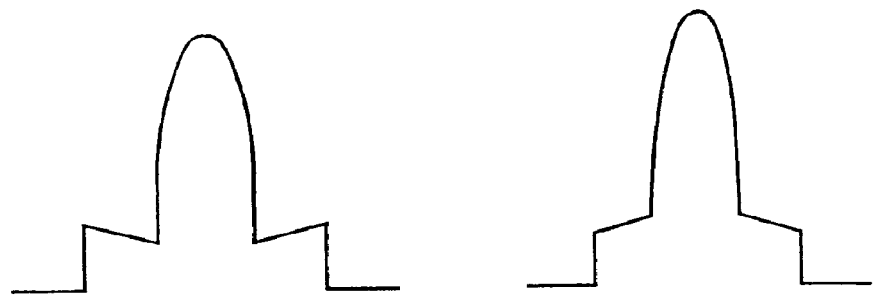
FIGS. 8A and 8B each are a diagram showing an example of the profile of the refractive index of an optical fiber according to the sixth embodiment of the present invention.

FIG. 7 is an explanatory diagram showing the profile of the refractive indexes of an optical fiber according to the fifth embodiment of the present invention. The refractive index profile shown in FIG. 5 indicates the refractive index of a first core 51, that of a second core 52, that of a third core 53 and that of a clad 54 in the order from the inner side. The diameter of the first core 51 is a, that of the second core 52 is b, and that of the third core 53 is c. The first core 51 has a minimum relative refractive index difference Δ1 with respect to that of the clad 54, the second core 52 has a maximum relative refractive index difference Δ2 with respect to that of the clad 54, and the third core 54 has a maximum relative refractive index difference Δ3 with respect to that of the clad 54. It should be noted that in FIG. 7, there is a relationship of Δ1≦0≦Δ3≦Δ2.

index distributions each shown in FIGS. 8A and 8B are basically of a similar type to that of FIG. 3 except that a refractive index varying section is formed in its side core. FIG. 8A shows a refractive index profile where the refractive index increases from the inner circumference of the side core to the outer circumference, and FIG. 8B shows a refractive index profile where the refractive index decreases from the inner circumference of the side core to the outer circumference.

As to the refractive index profile shown in FIGS. 8A and 8B, a simulation was carried out to an example in which the refractive index was varied from the inner circumference of the side core to the outer circumference with reference to the simulation results of "Sim 45" shown in Table 4 above, and the following results were obtained. Table 7 below shows these results.

TABLE 7

| Unit | Δ1 % | α | Δ2 % | a/b | Core diameter b μm | Dispersion value ps/nm/km | Dispersion slope ps/nm²/km | MFD μm | $A_{eff}$ μm² | λc nm |
|---|---|---|---|---|---|---|---|---|---|---|
| Sim45 | 0.40 | 3.0 | 0.15 | 0.50 | 14.50 | 15.50 | 0.0670 | 11.58 | 99.8 | 1477 |
| Sim71 | | | 0.1→0.2 | | 14.00 | 14.58 | 0.0688 | 11.46 | 97.7 | 1495 |
| Sim72 | | | 0.2→0.1 | | 15.00 | 16.27 | 0.0655 | 11.85 | 105.2 | 1505 |

In FIG. 7, when Δ3 is less than 0.1%, the effect of extending the $A_{eff}$ value is low and when Δ3 exceeds 0.3%, the cut-off wavelength increases thus making impossible to satisfy the single mode transmission conditions in the wavelength band of use. Under these circumstances, a case where Δ3 is fixed to 0.2% was examined. It should be noted that in this embodiment, Δ1, Δ2 and a core diameter ratio a/b were set as those of the fourth embodiment.

Within the above range, a simulation was conducted with regard to the refractive index profile shown in FIG. 7, and the following results were obtained. The results are shown in Table 6 below.

It should be noted that in Table 7 above, "0.1→0.2", for Δ2 indicates that the relative refractive index difference Δ2 increases from 0.1% to 0.2% substantially linearly from the inner circumference of the side core towards the outer circumference as shown in FIG. 8A, whereas "0.2→0.1" for Δ2 indicates that the relative refractive index difference Δ2 decreases from 0.2% to 0.1% substantially linearly from the inner circumference of the side core towards the outer circumference as shown in FIG. 8B.

As shown in Table 7 above, an optical fiber having a refractive index profile in which the refractive index increase from the inner circumference of the side core towards the outer circumference as shown in FIG. 8A, has

TABLE 6

| Unit | Δ1 % | Δ2 % | Δ3 % | a:b:c | Core diameter b μm | Dispersion value ps/nm/km | Dispersion slope ps/nm²/km | MFD μm | $A_{eff}$ μm² | λc nm |
|---|---|---|---|---|---|---|---|---|---|---|
| Sim61 | −0.4 | 0.6 | 0.20 | 1:2:4 | 10.00 | 14.51 | 0.066 | 10.64 | 99.4 | 1541 |
| Sim62 | −0.5 | 0.7 | 0.25 | 1:2:4 | 10.00 | 14.94 | 0.068 | 11.11 | 110.3 | 1536 |
| Sim63 | −0.5 | 0.6 | 0.30 | 1:2:3 | 10.00 | 13.08 | 0.069 | 11.28 | 114.8 | 1487 |

As shown in Table 6 above, in any one of the optical fibers, the $A_{eff}$ value is expanded to about 100 μm², or even more. Further, the dispersion values are set relatively small. Therefore, it is considered that as the length of the positive dispersion optical fiber increases as compared to the DCF, the optical power input to the DCF can be suppressed and thus the non-linear phenomenon can be suppressed.

Further, as to the side core 32 in the optical fiber of the third embodiment and the third core 53 of the optical fiber of the fifth embodiment, it is preferable that at least part thereof should be a refractive index varying section. Here, an example in which a refractive index varying section is formed in the side core 32 of the optical fiber of the third embodiment will now be described.

FIGS. 8A and 8B are explanatory diagrams each showing the refractive index profile of an optical fiber according to the six embodiment of the present invention. The refractive a tendency that its dispersion value becomes small as compared to an optical fiber having no substantial refractive index varying section shown in FIG. 3. Further, an optical fiber having a refractive index profile in which the refractive index increase from the inner circumference of the side core towards the outer circumference as shown in FIG. 8A, has a tendency that the $A_{eff}$ value becomes large as compared to an optical fiber having no substantial refractive index varying section shown in FIG. 3.

As alternative versions to the sixth embodiment, examples of the refractive index profile are shown in FIGS. 9A to 9F. FIGS. 9A to 9F each illustrates a refractive index profile of an optical fiber in which at least a part of its side core has a refractive index varying section.

It should be noted that a refractive index varying section may be formed in the third core 53 of the optical fiber of the fifth embodiment as mentioned before. More specifically, the shape of the third core 53 may be set similar to the shape of the side core shown in FIGS. 8A, 8B, or one of FIGS. 9A to 9F.

Various embodiments of the optical fiber according to the present invention have been described so far, and now an optical transmission line which employs the optical fiber of the present invention will now be described.

FIG. 10 is an explanatory diagram of an optical transmission system according to the seventh embodiment of the present invention, including an optical transmission line which employs the optical fibers according to the first to sixth embodiments of the present invention. In FIG. 10, reference numeral 61 denotes an optical transmitter, numerals 62a and 62b denote optical amplifiers, 63a and 63b denote positive dispersion optical fibers, 64a and 64b denote negative dispersion optical fibers such as DCF and the like, and 65 denotes an optical receiver.

The structure itself of the system shown in FIG. 10 is equivalent to the conventional system; however when the optical fibers of the present invention are used for a part thereof, more specifically, 63a, 63b and the like, the transmission property can be significantly improved.

That is, by applying the optical fibers of the present invention to the optical transmission system shown in FIG. 10, a low non-linearity (that is, FWM, SPM, XPM and the like are suppressed), a flatness of the dispersion slope, and a low bending loss property as an entire optical transmission line can be achieved. These properties of the low non-linearity, the flatness of the dispersion slope, and the low bending loss property of a novel optical transmission line which employs novel optical fibers are optimal for an optical transmission line. Thus, it has become possible to easily manufacture a link suitable for high-speed and large-capacity data transmission.

Embodiments

The effectiveness of the present invention will now be confirmed by way of the following embodiments. First, employing such a single peak structure as shown in FIG. 1, samples of optical fibers were prepared on the basis of the results of the simulation shown in Table 1 above. The results of the samples are shown in FIG. 8 below. The numbers assigned to the samples correspond respectively to the numbers of the simulations. For example, "sample case 21" corresponds to "Sim 21".

TABLE 8

| Unit | Transmission loss dB/km | Dispersion ps/nm/km | Dispersion slope ps/nm²/km | MFD μm | $A_{eff}$ μm² | Bending loss dB/m | λc nm |
|---|---|---|---|---|---|---|---|
| Trial example 21 | 0.185 | 17.3 | 0.057 | 11.74 | 110.2 | 9.7 | 1444 |
| Trial example 22 | 0.190 | 16.1 | 0.058 | 10.91 | 95.6 | 7.2 | 1395 |
| Trial example 24 | 0.200 | 13.2 | 0.059 | 10.89 | 95.1 | 5.3 | 1429 |

The results shown in Table 8 above approximately resemble those of Table 2 above. That is, with regard to all of the sample cases, the $A_{eff}$ value was 95 μm² or more and further, Δ1 was as small as that of the conventional SMF, and therefore it is expected that the distortion of the waveform due to the XPM and SPM can be suppressed. Further, the dispersion value at a 1.55 μm-wavelength band was sufficiently large approximately as the same level as that of the conventional SMF, and therefore it is expected that the signal noise due to the FMW can be suppressed. Furthermore, the loss and bending loss were suppressed to low values, and therefore it can be understood that they can be sufficiently of a practical use.

In particular, such a type as that of the sample case 24 has a small dispersion value, and therefore the length of the DCF used as it is connected to each optical fiber of the present invention can be shortened, and therefore it is expected mainly that the non-linearity in the DCF can be relatively suppressed.

Further, more samples were prepared on the basis of the results of the simulations, shown in Tables 3 and 4 above. The results of the samples are shown in Tables 9 and 10 below.

TABLE 9

| Unit | Transmission loss dB/km | Dispersion ps/nm/km | Dispersion slope ps/nm²/km | MFD μm | $A_{eff}$ μm² | Bending loss dB/m | λc nm |
|---|---|---|---|---|---|---|---|
| Trial example 31 | 0.190 | 19.1 | 0.061 | 14.38 | 161.8 | 4.9 | 1470 |
| Trial example 32 | 0.200 | 17.9 | 0.059 | 10.89 | 99.2 | 2.7 | 1394 |
| Trial example 33 | 0.205 | 12.1 | 0.058 | 10.11 | 89.6 | 1.2 | 1395 |

TABLE 10

| Unit | Transmission loss dB/km | Dispersion ps/nm/km | Dispersion slope ps/nm²/km | MFD μm | $A_{eff}$ μm² | Bending loss dB/m | λc nm |
|---|---|---|---|---|---|---|---|
| Trial example 41 | 0.195 | 17.8 | 0.062 | 13.77 | 150.9 | 5.0 | 1436 |
| Trial example 42 | 0.205 | 15.4 | 0.059 | 10.95 | 98.0 | 3.5 | 1465 |
| Trial example 43 | 0.210 | 11.2 | 0.058 | 10.79 | 90.6 | 1.3 | 1449 |
| Trial example 44 | 0.191 | 15.8 | 0.063 | 11.57 | 102.9 | 5.0 | 1436 |
| Trial example 45 | 0.196 | 15.3 | 0.065 | 11.38 | 98.0 | 3.5 | 1465 |
| Trial example 46 | 0.199 | 14.7 | 0.066 | 10.89 | 90.6 | 1.3 | 1449 |

The results shown in Tables 9 and 10 above approximately resemble those of Tables 3 and 4 above. That is, with regard to all of the sample cases, the $A_{eff}$ value was extended, and therefore it is expected that the distortion of the waveform due to the SPM and XPM can be suppressed. Further, although the profile becomes somewhat complicated as compared to the case of the optical fiber shown in FIG. 1, even if the $A_{eff}$ value was extended, the bending loss was suppressed to a small level.

In particular, such types as those of the sample cases 33 and 34, the dispersion value was suppressed to a small value, and therefore a new effect of becoming able to suppress the non-linearity of a fiber in a later stage can be expected.

Further, more samples were prepared on the basis of the results of the simulations, shown in Tables 5 and 6 above. The results of the samples are shown in Table 11 below.

The results shown in Table 11 above approximately resemble those of Tables 5 and 6 above. That is, since the optical fibers shown in FIGS. 6 and 7 each have a depressed distribution portion at the central portion, the refractive index distribution becomes somewhat complicated; however the $A_{eff}$ value was extended and the absolute value of the dispersion was made small, and therefore it is considered that as an entire optical transmission line, a significant suppression of the non-linear phenomenon can be achieved. Further, the transmission loss and bending loss can be suppressed to low levels as compared to those of the conventional case.

Further, more samples were prepared on the basis of the results of the simulation, shown in Table 7 above. Here, a sample of the optical fiber corresponding to "Sim 71" of Table 7 above was prepared. The results of the samples are shown in Table 12 below.

TABLE 11

| Unit | Transmission loss dB/km | Dispersion ps/nm/km | Dispersion slope ps/nm²/km | MFD μm | $A_{eff}$ μm² | Bending loss dB/m | λc nm |
|---|---|---|---|---|---|---|---|
| Trial example 51 | 0.210 | 8.1 | 0.071 | 10.08 | 89.8 | 3.9 | 1470 |
| Trial example 53 | 0.206 | 7.9 | 0.072 | 9.84 | 80.2 | 3.7 | 1394 |
| Trial example 62 | 0.215 | 12.4 | 0.078 | 11.11 | 111.6 | 8.2 | 1495 |
| Trial example 63 | 0.215 | 13.8 | 0.072 | 11.27 | 117.2 | 7.9 | 1468 |

TABLE 12

| Unit | Transmission loss dB/km | Dispersion ps/nm/km | Dispersion slope ps/nm²/km | MFD μm | $A_{eff}$ μm² | Bending loss dB/m | λc nm | PMD ps/km$^{1/2}$ |
|---|---|---|---|---|---|---|---|---|
| Trial example 71a | 0.197 | 14.6 | 0.066 | 11.17 | 96.0 | 3.0 | 1516 | 0.05 |
| Trial example 71b | 0.190 | 14.3 | 0.067 | 11.05 | 93.8 | 3.7 | 1495 | 0.04 |
| Trial example 71c | 0.195 | 13.9 | 0.066 | 10.89 | 90.3 | 3.3 | 1488 | 0.03 |

The results shown in Table 12 above approximately resemble those of Table 7 above. That is, since the optical fiber shown in FIG. 8 has a refractive index varying portion, the $A_{eff}$ value was extended and the absolute value of the dispersion was made small, and therefore it is considered that as an entire optical transmission line, a significant suppression of the non-linear phenomenon can be achieved. Further, the transmission loss and bending loss can be suppressed to low levels as compared to those of the conventional case.

As described above, the positive dispersion fiber of the present invention has excellent properties in the low non-linearity, low loss and bending loss. In the case where WDM transmission is attempted at a 1.5 µm-wavelength band, the dispersion and dispersion slope will act as obstacles. However, a low dispersion can be achieved in a wide wavelength range by connecting a dispersion compensation optical fiber or a dispersion slope compensation optical fiber or the like thereto. Therefore, it is considered that such a problem should be solved in the future with great possibilities.

Further, the optical fiber of the present invention has a small dispersion as compared to that of the conventional SMF, and therefore it is understood that the length of the dispersion compensation optical fiber used as being connected to the optical fiber of the present invention can be shortened, and thus a further low non-linearity can be achieved as an entire optical transmission line. Further, with regard to the core 1 shown in FIG. 1 and the center core 1 in each of FIGS. 2 and 3, the relative refractive index difference is set substantially lower that that of the conventional SMF, and therefore the PMD in any of the fibers exhibited a low value as 0.1 ps/km$^{1/2}$ or less.

As described in detail above, according to the present invention, it is possible to establish a low non-linear positive dispersion fiber suitable for high-speed and large-capacity data transmission and having a further lower non-linearity than that of the conventional SMF, a low transmission loss, low bending loss and a low PMD, as well as an optical transmission line which employs such an optical fiber. The optical fiber and optical transmission line of the present invention are used suitably, particularly, in a wavelength division multiplex (WDM) optical communication.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical fiber suitable for use in a dispersion managed transmission line, which has a ratio of a dispersion to a dispersion slope being positive at a wavelength of 1550 nm, a positive dispersion of 14 to 24 ps/nm/km in a wavelength band of 1530 to 1570 nm, a positive dispersion slope of not more than 0.08 ps/nm$^2$/km in a wavelength band of 1530 to 1570 nm, a transmission loss of not more than 0.25 dB/km at a wavelength of 1550 nm, an effective core area of not less than 95 µm$^2$ at a wavelength of 1550 nm, a bending loss of 20 dB/m or less at a bending diameter of 20 mm and at a wavelength of 1550 nm, and a polarization mode dispersion of 0.15 ps/km$^{1/2}$ or less at a wavelength of 1550 nm, and which operates in a single mode in a wavelength band of 1530 to 1570 nm.

2. An optical transmission line comprising the optical fiber recited in claim 1.

3. An optical fiber suitable for use in a dispersion managed transmission line, which has a ratio of a dispersion to a dispersion slope being positive at a wavelength of 1550 nm, a positive dispersion of 14 to 24 ps/nm/km in a wavelength band of 1530 to 1570 nm, an effective core area of not less than 90 µm$^2$ at a wavelength of 1550 nm, and a bending loss of 20 dB/m or less at a bending diameter of 20 mm and at a wavelength of 1550 nm.

4. An optical transmission line comprising the optical fiber recited in claim 3.

5. An optical fiber suitable for use in a dispersion managed transmission line, which has a ratio of a dispersion to a dispersion slope being positive at a wavelength of 1550 nm, a positive dispersion of 14 to 17 ps/nm/km in a wavelength band of 1530 to 1570 nm, a positive dispersion slope of not more than 0.08 ps/nm$^2$/km in a wavelength band of 1530 to 1570 nm, a transmission loss of not more than 0.25 dB/km at a wavelength of 1550 nm, an effective core area of not less than 90 µm$^2$ at a wavelength of 1550 nm, a bending loss of 20 dB/m or less at a bending diameter of 20 mm and at a wavelength of 1550 nm, and a polarization mode dispersion of 0.15 ps/km$^{1/2}$ or less at a wavelength of 1550 nm, and which operates in a single mode in a wavelength band of 1530 to 1570 nm.

6. An optical transmission line comprising the optical fiber recited in claim 5.

* * * * *

UNITED STATES PATENT AND TRADEMARK OFFICE
CERTIFICATE OF CORRECTION

PATENT NO. : 6,959,136 B2  Page 1 of 1
DATED : October 25, 2005
INVENTOR(S) : Kazunori Mukasa It is certified that error appears in the above-identified patent and that said Letters Patent is hereby corrected as shown below:

<u>Title page,</u>
Item [63], Related U.S. Application Data, change "PCT/JP00/00513" to
-- PCT/JP00/05513 --.

Signed and Sealed this

Sixteenth Day of May, 2006

JON W. DUDAS
*Director of the United States Patent and Trademark Office*